(12) United States Patent
McGee

(10) Patent No.: US 11,066,308 B2
(45) Date of Patent: Jul. 20, 2021

(54) PREPARATION OF METAL DIBORIDE AND BORON-DOPED POWDERS

(71) Applicant: United Technologies Corporation, Farmington, CT (US)

(72) Inventor: Randolph Carlton McGee, Hamden, CT (US)

(73) Assignee: United Technologies Corporation, Farmington, CT (US)

( * ) Notice: Subject to any disclaimer, the term of this patent is extended or adjusted under 35 U.S.C. 154(b) by 72 days.

(21) Appl. No.: 16/268,224

(22) Filed: Feb. 5, 2019

(65) Prior Publication Data

US 2020/0247680 A1 Aug. 6, 2020

(51) Int. Cl.
 *C01B 35/00* (2006.01)
 *C01B 35/04* (2006.01)

(52) U.S. Cl.
 CPC .......... *C01B 35/04* (2013.01); *C01P 2006/32* (2013.01); *C01P 2006/40* (2013.01)

(58) Field of Classification Search
 None
 See application file for complete search history.

(56) References Cited

U.S. PATENT DOCUMENTS

| 3,025,138 | A | * | 3/1962 | Davis | ...................... | C01B 35/06 |
| | | | | | | 423/292 |
| 4,289,545 | A | * | 9/1981 | Thevenot | .................. | C23C 8/68 |
| | | | | | | 148/279 |

| 4,503,021 | A | 3/1985 | Brynestad et al. |
| 4,637,837 | A | 1/1987 | Von Matuschka et al. |
| 5,169,832 | A | 12/1992 | Khazai et al. |
| 2010/0018611 | A1 | 1/2010 | Timur et al. |
| 2012/0272788 | A1 | 11/2012 | Withers et al. |

FOREIGN PATENT DOCUMENTS

JP 2004099367 A 4/2004

OTHER PUBLICATIONS

C. L. Yeh et al., "Preparation of niobium borides NbB and NbB2 by self-propagating combustion synthesis", from Journal of Alloys and Compounds 420 (2006) pp. 111-116.
S. E. Kravchenko, et al., "Preparation of Hafnium Diboride Nanopowders in an Anhydrous Na2B4O7 Ionic Melt", from Inorganic Materials, 2015, vol. 51, No. 4, pp. 380-383.
J. Yu, et al., "Carbothermal reduction synthesis of TiB2 ultrafine powders", from Ceramics International42(2016) pp. 3916-3920.
N. Ackamli, et al., "Synthesis of HfB2 powders by mechanically activated borothermal reduction of HfCl4", from Ceramics International 42 (2016) pp. 3797-3807.
Extended European Search Report for EP Application No. 20155230. 4, dated Nov. 13, 2020, 10 pages.

* cited by examiner

*Primary Examiner* — Stefanie J Cohen
(74) *Attorney, Agent, or Firm* — Kinney & Lange, P.A.

(57) ABSTRACT

A method for producing a metal boride powder includes producing a bonding gas stream from a first powder in a first fluidizing bed reactor, delivering the bonding gas stream to a second fluidized bed reactor through a conduit fluidly connecting the first and second fluidized bed reactors, fluidizing a second powder in the second fluidized bed reactor, mixing the second powder with the bonding gas stream such that a metal boride or boron-doped powder is formed.

12 Claims, 2 Drawing Sheets

PREPARATION OF METAL DIBORIDE AND BORON-DOPED POWDERS

BACKGROUND

The present disclosure generally relates to materials for ultrahigh temperature applications and more particularly relates to a method and system for producing metal and alloy boride powders for production of ultrahigh temperature ceramics.

Titanium diboride powder, among other metal and alloy boride powders, are promising materials for ultrahigh temperature ceramic applications because of the properties they exhibit including excellent hardness, high melting point, wear resistance, good thermal and electrical conductivity, and chemical inertness. Conventional manufacture methods utilize carbothermal reduction, mechanical alloying, sol-gel methods, or high temperature synthesis. Carbothermal reduction is a simple and commonly used method but leads to impurities, unwanted grain size, extensive subsequent processing, and added cost. Titanium diboride (among other metal and alloy borides) is a promising material for engineering applications including abrasive and cutting tools, wear-resistance coating, cemented carbide, cathodes for aluminum electrolysis cells, and crucibles for holding molten metals. Titanium alloy/titanium boride reinforced composites offer high stiffness and strength from reinforcing boride particles and toughness from the titanium alloy matrix. Other transition metal borides are also promising materials for ultrahigh temperature ceramics applications and are gaining attention for new hypersonic vehicle developments.

Given the growing application for metal boride powders, an improved method of production is needed that overcomes the drawbacks of conventional production methods.

SUMMARY

In one aspect, a method for producing a metal boride powder includes producing a boriding gas stream from a first powder in a first fluidizing bed reactor, delivering the boriding gas stream to a second fluidized bed reactor through a conduit fluidly connecting the first and second fluidized bed reactors, fluidizing a second powder in the second fluidized bed reactor, mixing the second powder with the boriding gas stream such that a metal boride or boron-doped powder is formed.

In another aspect, an assembly for producing a metal boride powder includes a first fluidized bed reactor configured to produce a boriding gas stream from a first powder, a second fluidized bed reactor fluidly coupled to the first fluidized bed reactor through a first conduit configured to deliver the boriding gas stream to the second fluidized bed reactor. The second fluidized bed reactor is configured to mix the boriding gas stream with a second powder, selected from the group consisting of metal oxides, metal hydroxides, and alloys to produce a metal boride or boron-doped powder.

The present summary is provided only by way of example, and not limitation. Other aspects of the present disclosure will be appreciated in view of the entirety of the present disclosure, including the entire text, claims and accompanying figures.

Figure 1:
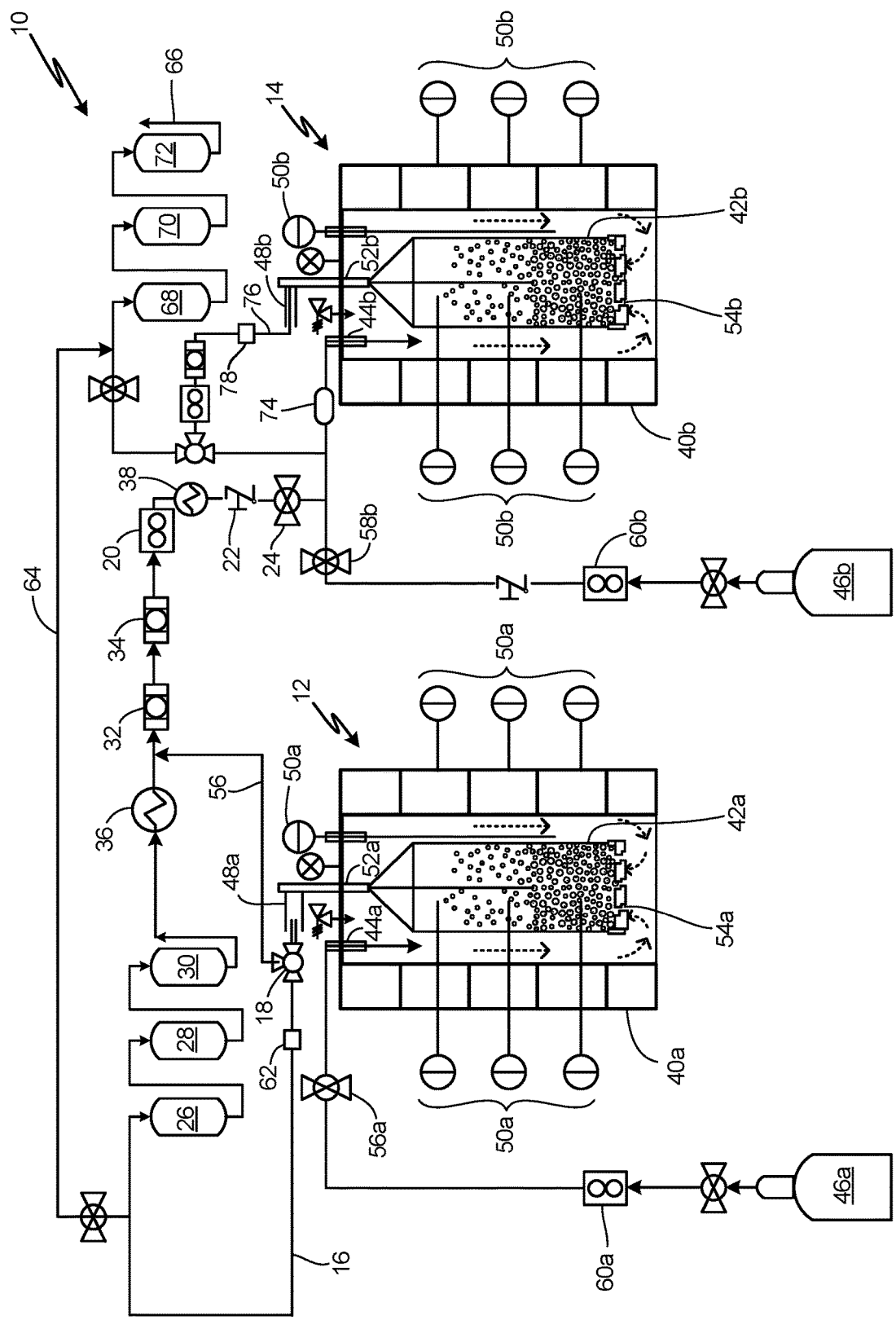
FIG. 1 is a schematic view of an assembly for producing metal boride and boron-doped powders.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Titanium diboride powders, among other metal and alloy boride powders, are promising materials for ultrahigh temperature ceramic applications. The present disclosure seeks to overcome drawbacks of conventional manufacture of these powders by combining boriding powders and fluidized bed technology to produce a boriding gas stream that can be delivered to a second fluidized bed reactor for incorporation into the lattice structure of a metal oxide, metal hydroxide, or alloy powders.

FIG. 1 is a schematic view of dual-fluidized bed reactor assembly 10 for producing metal boride and boron-doped powders. Assembly 10 includes first fluidized bed reactor 12 (hereinafter, "first reactor"), configured to produce a boriding gas stream, and second fluidized bed reactor 14 (hereinafter, "second reactor"), fluidly connected to first fluidized bed reactor 12 and configured to produce a metal boride or boron-doped powder for use in commercial applications. First and second reactors 12, 14 are fluidly connected by conduit 16, which can include a plurality of interconnected conduits (unnumbered) and valves 18, 20, 22, 24, and which can deliver the boriding gas stream to and from a plurality of optional contaminant scrubbers 26, 38, 30, filters 32, 34, and heat exchangers 36, 38 to produce an uncontaminated and heated stream of boriding gas suitable for boriding powders of metal oxides, metal hydroxides, and alloys in second reactor 14.

First and second reactors 12 and 14 are known in the art and can be of substantially identical configuration although operated using different operational parameters and conditions. For simplicity, first and second reactors 12 and 14 are described congruently, although it should be appreciated that first and second reactors 12 and 14 can differ and may be individually optimized to accommodate differing operations.

First and second reactors 12 and 14 include furnace 40a/40b, reactor chamber 42a/42b, fluidizing gas inlet 44a/44b connected to inert gas source 46a/46b, and exhaust gas outlet 48a/48b. Furnace 40a/40b can be a single-zone or multi-zone furnace as illustrated in the embodiments in FIG. 1, which include three heating zones, each with temperature controls 50a/50b. Multiple heating zones are not necessary but can provide better temperature control and uniformity of temperature throughout reactor chamber 42a/42b. Furnace 40a can be capable of heating reactor chamber 42a and maintaining a reactor chamber temperature in excess of 1,300 degrees Celsius for up to 10 hours. Furnace 40b can generally be operated at a lower temperature but can be configured to heat reactor chamber 42b and maintain a reactor chamber temperature in excess of 850 degrees Celsius for up to 10 hours.

Reactor chamber 42a/42b is positioned within a chamber of furnace 40a/40b. Reactor chamber 42a/42b can be suspended from a top of furnace 40a/40b by tube 52a/52b, such that reactor chamber walls are spaced apart from furnace walls to allow fluidizing gas to flow along an outer wall of reactor chamber 42a/42b before entering reactor chamber 42a/42b at a bottom end. Reactor chamber 42a/42b has porous plate 54a/54b on a bottom end which retains a powder within reactor chamber 42a/42b while allowing a fluidizing gas to enter reactor chamber 42a/42b.

An inert gas, such as argon or helium, can enter an inner chamber of furnace 40a/40b through gas inlet 44a/44b at the top of first/second reactor 12/14. The fluidizing gas is heated in the furnace before entering reactor chamber 42a/42b. In alternative embodiments, fluidizing gas can also be heated in a preheater (not shown) upstream of furnace 40a/40b. Powder within reactor chamber 42a/42b can be fluidized by the inert gas, mixed, and heated within reactor chamber 42a/42b. Exhaust gas can exit first and second reactors 12 and 14 through exhaust gas outlet 48a/48b.

First reactor 12 is configured to fluidize and decompose boriding powders contained in reactor chamber 42a. Boriding powders can include commercially available boriding powders, such as EKABOR®1. Preferred boriding powders can include but are not limited to mixtures including 85% boron carbide ($B_4C$) and 15% sodium carbonate ($Na_2CO_3$), 84% $B_4C$ and 16% Borax ($Na_2B_4O_7$), and 100% $B_4C$. Some boriding powders contain large amounts of diluent such as silicon carbide (SiC) in addition to activators like potassium tetrafluoroborate ($KBF_4$), sodium tetrafluoroborat ($NaBF_4$) and ammonium tetrafluoroborate ($NH_4BF_4$). Diluents can be chosen from either $Al_2O_3$, SiC, $ZrO_2$, or varying combinations. The presence of SiC can result in competitive simultaneous siliconizing, while $KBF_4$ can introduce safety issue due to the potential for hydrogen fluoride (HF) formation. For this reason, it may be desirable to avoid such powders. The presence of small amounts of $KBF_4$ can be handled by including scrubbers 26-30 to remove any HF or fluorinated species produced in the production of the boriding gas stream. Scrubbers 26-30 may be left out of assembly 10 depending on the composition of the boriding powder. Alternatively, a bypass conduit 56 can cause the boriding gas stream to bypass scrubbers 26-30 for boriding powders that do not contain $KBF_4$ or other fluorinated compounds.

Boriding powder can have particle sizes ranging from 10 microns to 1.4 millimeters. The fluidizing velocity can be set in accordance with particle size, with larger particles requiring substantially higher fluidizing velocities of the inert gas stream (e.g., a maximum fluidizing velocity to circulate 10 micron particles can be 0.02 m/s, while a maximum fluidizing velocity to circulate 1.4 millimeter particles can be 32 m/s). Fluidizing velocity can also be adjusted based on the temperature of reactor chamber 42a, with higher fluidizing velocity generally required at lower temperatures. Fluidizing velocity can be controlled by valve 58a and/or mass flow controller 60a.

The temperature required to decompose boriding powder to produce the boriding gas stream can vary depending on the powder composition. Typically, temperatures between 700 and 1,050 degrees Celsius can cause decomposition, however, higher temperatures, including up to 1,500 degrees Celsius, may be necessary for some powder compositions. Temperatures as low as 600 degrees Celsius may also be suitable for the decomposition of some boriding powder compositions. The boron source (i.e. $B_4C$, amorphous boron, etc.) decomposes to form gas streams containing boron trihalides (e.g. $BF_3$, $BCl_3$). For instance, when a boriding mixture containing amorphous boron and $NH_4Cl$ is decomposed, the resulting gas stream can contain HCl, $BCl_3$, $BCl_2H$, $BCl_2$, $BH_3$, BCl, Cl, and BClH. For complete decomposition, reactor chamber 42a can be held at a decomposition temperature for a period of time ranging from 1 to 10 hours. The time required for complete decomposition can vary depending on the temperature of reactor chamber 42a, amount of material, particle size, flow conditions, and ramp rate (i.e., time to reach decomposition temperature). A slower ramp rate can reduce the required hold time once the decomposition temperature is reached.

An inline gas chromatograph/mass spectrometer (GC/MS) 62 can be located in fluid communication with conduit 16 to sample an exhaust gas from reactor chamber 42a. GC/MS 62 can be positioned to sample exhaust gas between outlet 48a of first reactor 12 and inlet 44b of second reactor 14. As illustrated in FIG. 1, GC/MS 62 can be disposed upstream of scrubbers 26-30, although other locations are contemplated. GC/MS 62 can be used to detect the presence or absence of the boriding gas stream and provide such information in real time to a controller or operator. Exhaust gas from first reactor 12 can be delivered to second reactor 14 at any time during the decomposition process, including before the boriding gas stream is produced. However, reaction in second reactor 14 will not occur until boriding gas is delivered from first reactor 12. GC/MS 62 can be used to determine a start time for reaction in second reactor 14 as indicated by the presence of boriding gas in the exhaust gas from reactor 12. In alternative embodiments, exhaust gas from first reactor 12 can be vented through bypass line 64 to an exhaust vent 66 thereby bypassing second reactor 14 completely until GC/MS 62 detects the presence of the boriding gas stream in conduit 16. Exhaust gas can be directed through a series of scrubbers 68-72, if necessary, to remove contaminants, before venting to the atmosphere. When the boriding gas stream is detected, bypass conduit 64 can be closed and the boriding gas stream can be directed through conduit 16 to second reactor 14. Before entering second reactor 14, the boriding gas stream can be directed through scrubbers 26-30 to remove contaminants, as previously discussed, and a series of filters 32, 34 to remove any moisture that may be present in the gas stream. Heat exchangers 36, and 38 can be used to condense water vapor that might be present in the gas stream and to reheat the boriding gas stream, respectively.

The fluidizing velocity of the boriding gas stream may not be sufficient to fluidize powder in second reactor 14. Supplemental fluidizing velocity can be provided by an inert gas (e.g., argon or helium) from inert gas source 46b. The velocity of inert gas can be controlled by valve 58b and/or mass flow controller 60b. The inert gas stream and boriding gas stream can be mixed in mixer 74 prior to delivery to second reactor 14.

Second reactor 14 is configured to fluidize powder capable of producing a metal boride when heated in the presence of the boriding gas stream. Suitable powders can include metal oxides and hydroxides of Group IV, V, and VI metals, including but not limited to titanium dioxide ($TiO_2$), and alloys. While titanium diboride ($TiB_2$) has been recognized as a promising material for ultrahigh temperature ceramics applications, other transition metal borides are of interest, including but not limited zirconium diboride ($ZrB_2$), hafnium diboride ($HfB_2$), niobium diboride ($NbB_2$), and tantalum diboride ($TaB_2$). The risk of sintering can be increased with use of metal hydroxides and, therefore, use of metal oxide and alloy powders may be preferred. The boriding gas stream is mixed with the powders in reactor chamber 42b to produce boron-doped powders and/or metal boride. The powders in reactor chamber 42b can be metal oxides (i.e. $MO_3$) or metal hydroxides (i.e. $H_4MO_4$), where M=metal (including alloys), O=oxygen, and H=hydrogen, or can be an alloy (e.g., titanium, aluminum, cobalt, copper or nickel base). As boriding species from the boriding gas stream contact the surface of the metal oxide or metal hydroxide powder particles, the surface oxygen and OH species will gradually be removed and replaced by the boriding species, which adsorb on the surface. This surface functionalization results in "borided" surface, or as referred to herein as a "boron-doped powder." The boriding gas will also diffuse into the surface of alloy powders. As reaction time and temperature increase and the thickness of the surface boride layer increases, the boron species begin to diffuse into the bulk structure of the powder (displacing the bulk oxygen in oxides and hydroxides) to form bulk metal boride powders (referred to interchangeably herein as metal "diborides"). Reactor chamber 42b can be used to produce both boron-doped powders and metal boride.

It will be understood by one of ordinary skill in the art that the degree of doping or boriding will depend on the operational parameters, including but not limited to reactor temperature, fluidizing velocity, particle size, availability of boriding species (i.e., boriding gas concentration), and residence time. The boriding gas stream can be recycled through reactor chamber 42b to optimize the boriding reaction. The boriding gas stream can be recycled from exhaust outlet 48b back to inlet 44b through conduit 76. Second reactor 14 can be held at a boriding temperature for a period of time ranging from 1 to 10 hours to allow for complete reaction of the powder in reactor chamber 42b. Similar to the decomposition of boriding powders, the boriding process time can vary depending on the temperature of reactor chamber 42b, amount of material, particle size, flow conditions, and ramp rate. Particle size of powder in reactor chamber 42b can generally range from 5 nm to 2.0 μm. A second inline GC/MS 78 or suitable sensor can be placed on an outlet conduit from exhaust outlet 48b of second reactor 14 to detect the presence of boriding gas stream and/or byproducts of the reaction between the boriding gas stream and metal oxide or metal hydroxide powders (e.g., carbon dioxide or water) to assist in determining if the reaction is complete and whether or not recycle of the exhaust stream should be continued.

First reactor 12 continues to produce the boriding gas stream and provide the boriding gas stream to second reactor 14 throughout the boriding process. Boriding powder can be added intermittently to reactor chamber 42a of first reactor 12 or upon completion of decomposition of available powder in reactor chamber 42a. Second reactor 14 can be maintained at a boriding temperature even in the absence of a boriding gas stream under inert gas, such that the boriding process can begin as soon as the boriding gas stream becomes available.

Figure 2:
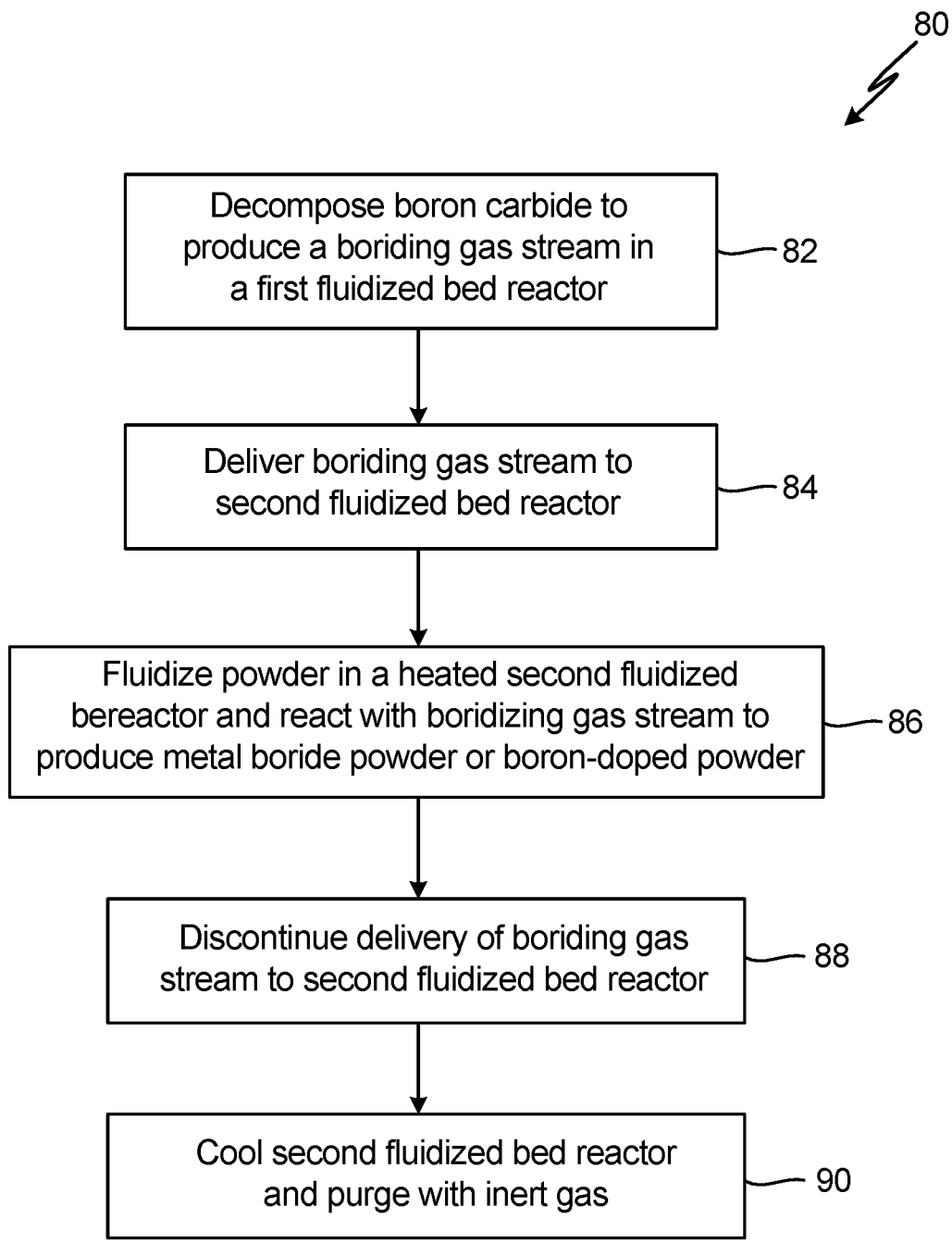
FIG. 2 is a flow diagram of a method for producing metal boride and boron-doped powders using the system of FIG. 1.

FIG. 2 is a flow diagram of method 80 for producing metal borides or boron-doped powders using assembly 10 substantially as described with respect to FIG. 1. In step 82, $B_4C$ is decomposed in first reactor 12 to produce a boriding gas stream. As disclosed with respect to FIG. 1, the decomposition process can take 1 to 10 hours depending on the amount of material, flow conditions, particle size, temperature of reactor chamber 42a, and ramp rate. In step 84, the boriding gas stream is delivered to second reactor 14. Prior to delivery, the boriding gas stream can be passed through a series of scrubbers and/or filters to remove contaminants and moisture that may be present. If the boriding gas stream does not have a flow velocity sufficient to fluidize powder in second reactor 14, supplemental inert gas can be delivered to obtain a desired fluidizing velocity in reactor chamber 42b. The fluidized powder is mixed with the boriding gas stream and heated in step 86 to allow boron to diffuse into the lattice structure of the metal oxides, hydroxides, or alloys to form a metal boride or boron-doped powder. When the boriding process is complete, the delivery of the boriding gas stream is discontinued as first reactor 12 is isolated from second reactor 14 and shut down. In step 90, second reactor 14 is shut down and allowed to cool, reactor chamber 42b is purged with an inert gas, and the metal boride or boron-doped powder is removed.

Conventional metal boride powder manufacturing methods can lead to impurities, unwanted grain size, extensive subsequent processing, and added cost. Dual fluidized bed reactor assembly 10 overcomes many of the drawbacks of the conventional processes and can be used to produce high purity metal borides with optimal mechanical, thermal, and electrical properties.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A method for producing a metal boride powder according to an exemplary embodiment of this disclosure, among other possible things includes producing a boriding gas stream from a first powder in a first fluidizing bed reactor, delivering the boriding gas stream to a second fluidized bed reactor through a conduit fluidly connecting the first and second fluidized bed reactors, fluidizing a second powder in the second fluidized bed reactor, mixing the second powder with the boriding gas stream such that a metal boride powder is formed.

The method of the preceding paragraph can optionally include, additionally and/or alternatively, any one or more of the following features, configurations, additional components, and/or steps:

A further embodiment of the foregoing method can further include fluidizing the boron carbide in a first chamber of the fluidized bed reactor, wherein the first power comprises boron carbide.

A further embodiment of any of the foregoing methods, wherein the second powder can be selected from the group consisting of metal oxides and metal hydroxides.

A further embodiment of any of the foregoing methods can further include heating the first chamber to a temperature ranging from approximately 600 to 1500 degrees Celsius to promote decomposition of the boron carbide and formation of the boriding gas stream.

A further embodiment of any of the foregoing methods, wherein the first powder can have a particle size ranging from approximately 10 microns to 1.4 millimeters.

A further embodiment of any of the foregoing methods can further include sampling a first exhaust gas from the first fluidized bed reactor to detect the formation of the boriding gas stream.

A further embodiment of any of the foregoing methods can further include delivering a mixture of the boriding gas stream and an inert gas to the second fluidizing bed reactor to fluidize the second powder.

A further embodiment of any of the foregoing methods can further include recycling the boriding gas stream from an exhaust outlet of the second fluidizing bed reactor to an inlet of the second fluidizing bed reactor.

A further embodiment of any of the foregoing methods can further include heating a second chamber of the second fluidizing bed reactor to a temperature within the range of 500 to 850 degrees Celsius.

A further embodiment of any of the foregoing methods can further include sampling an exhaust gas from the second fluidized bed reactor to detect a product formed in the reaction of the boriding gas stream and the second powder.

A further embodiment of any of the foregoing methods can further include discontinuing supply of the boriding gas stream to the second fluidized bed reactor, cooling the second fluidized bed reactor, and purging the second fluidized bed reactor with an inert gas.

An assembly for producing a metal boride powder according to an exemplary embodiment of this disclosure, among other possible things includes a first fluidized bed reactor configured to produce a boriding gas stream from a first powder, a second fluidized bed reactor fluidly coupled to the first fluidized bed reactor through a first conduit configured to deliver the boriding gas stream to the second fluidized bed reactor. The second fluidized bed reactor is configured to mix the boriding gas stream with a second powder, selected from the group consisting of metal oxides and metal hydroxides to produce a metal boride powder.

The assembly of the preceding paragraph can optionally include, additionally and/or alternatively, any one or more of the following features, configurations, and/or additional components:

A further embodiment of the foregoing assembly, wherein the first powder can comprise boron carbide.

A further embodiment of any of the foregoing assemblies, wherein the first powder can have a particle size ranging from approximately 10 microns to 1.4 millimeters.

A further embodiment of any of the foregoing assemblies can further include a first inert gas source fluidly coupled to a first reactor chamber of the first fluidized bed reactor to fluidize the first powder in the first reactor chamber.

A further embodiment of any of the foregoing assemblies can further include a second inert gas source fluidly coupled to a second reactor chamber of the second fluidized bed reactor to fluidized the second powder in the second reactor chamber.

A further embodiment of any of the foregoing assemblies, wherein the first reactor chamber is configured to be heated to a temperature ranging from 600 to 1500 degrees Celsius to promote decomposition of the boron carbide and production of the boriding gas stream.

A further embodiment of any of the foregoing assemblies can further include a bypass conduit fluidly connecting the first conduit to an exhaust vent, thereby bypassing the second fluidized bed reactor, and a valve configured to alternatively direct gas from the first fluidized bed reactor to the exhaust vent and to the second fluidized bed reactor.

A further embodiment of any of the foregoing assemblies can further include an in-line gas chromatography/mass spectrometer (GC/MC) configured to sample a gas stream in the first conduit to detect the presence of the boriding gas stream.

A further embodiment of any of the foregoing assemblies can further include an in-line gas chromatography/mass spectrometer (GC/MS) configured to sample a gas stream in an exhaust outlet from the second fluidized bed reactor to detect a product formed in the reaction of the boriding gas stream and the second powder.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for producing a powder for use in high temperature ceramic applications, the method comprising:
    producing a boriding gas stream from a first powder in a first fluidizing bed reactor;
    delivering the boriding gas stream to a second fluidized bed reactor through a conduit fluidly connecting the first and second fluidized bed reactors, the second fluidized bed reactor containing a second powder selected from the group consisting of metal oxides, metal hydroxides, and alloys;
    fluidizing the second powder in the second fluidized bed reactor; and
    mixing the second powder with the boriding gas stream such that a metal boride powder or boron-doped powder is formed.

2. The method of claim 1, and further comprising fluidizing the first powder in a first chamber of the fluidized bed reactor, wherein the first power comprises boron carbide.

3. The method of claim 2, and further comprising fluidizing the first powder with an inert gas delivered to the first reactor.

4. The method of claim 2, and further comprising heating the first chamber to a temperature ranging from approximately 600 to 1500 degrees Celsius to promote decomposition of the boron carbide and formation of the boriding gas stream.

5. The method of claim 4, wherein the first powder has a particle size ranging from approximately 10 microns to 1.4 millimeters.

6. The method of claim 4, and further comprising sampling a first exhaust gas from the first fluidized bed reactor to detect the formation of the boriding gas stream.

7. The method of claim 6, and further comprising:
delivering the first exhaust gas to an exhaust vent thereby bypassing the second reactor when the presence of the boriding gas stream is not detected; and
delivering the first exhaust gas to the second reactor when the presence of the boriding gas stream is detected.

8. The method of claim 4, and further comprising delivering a mixture of the boriding gas stream and an inert gas to the second fluidizing bed reactor to fluidize the second powder.

9. The method of claim 8, and further comprising recycling the boriding gas stream from an exhaust outlet of the second fluidizing bed reactor to an inlet of the second fluidizing bed reactor.

10. The method of claim 8, and further comprising heating a second chamber of the second fluidizing bed reactor to a temperature within the range of 500 to 850 degrees Celsius.

11. The method of claim 9, and further comprising sampling an exhaust gas from the second fluidized bed reactor to detect a product formed in the reaction of the boriding gas stream and the second powder.

12. The method of claim 9, and further comprising:
discontinuing supply of the boriding gas stream to the second fluidized bed reactor;
cooling the second fluidized bed reactor; and
purging the second fluidized bed reactor with an inert gas.

\* \* \* \* \*